H. N. PIERCE.
WOODWORKING MACHINE.
APPLICATION FILED OCT. 7, 1911.
1,105,301.
Patented July 28, 1914.
3 SHEETS—SHEET 1.
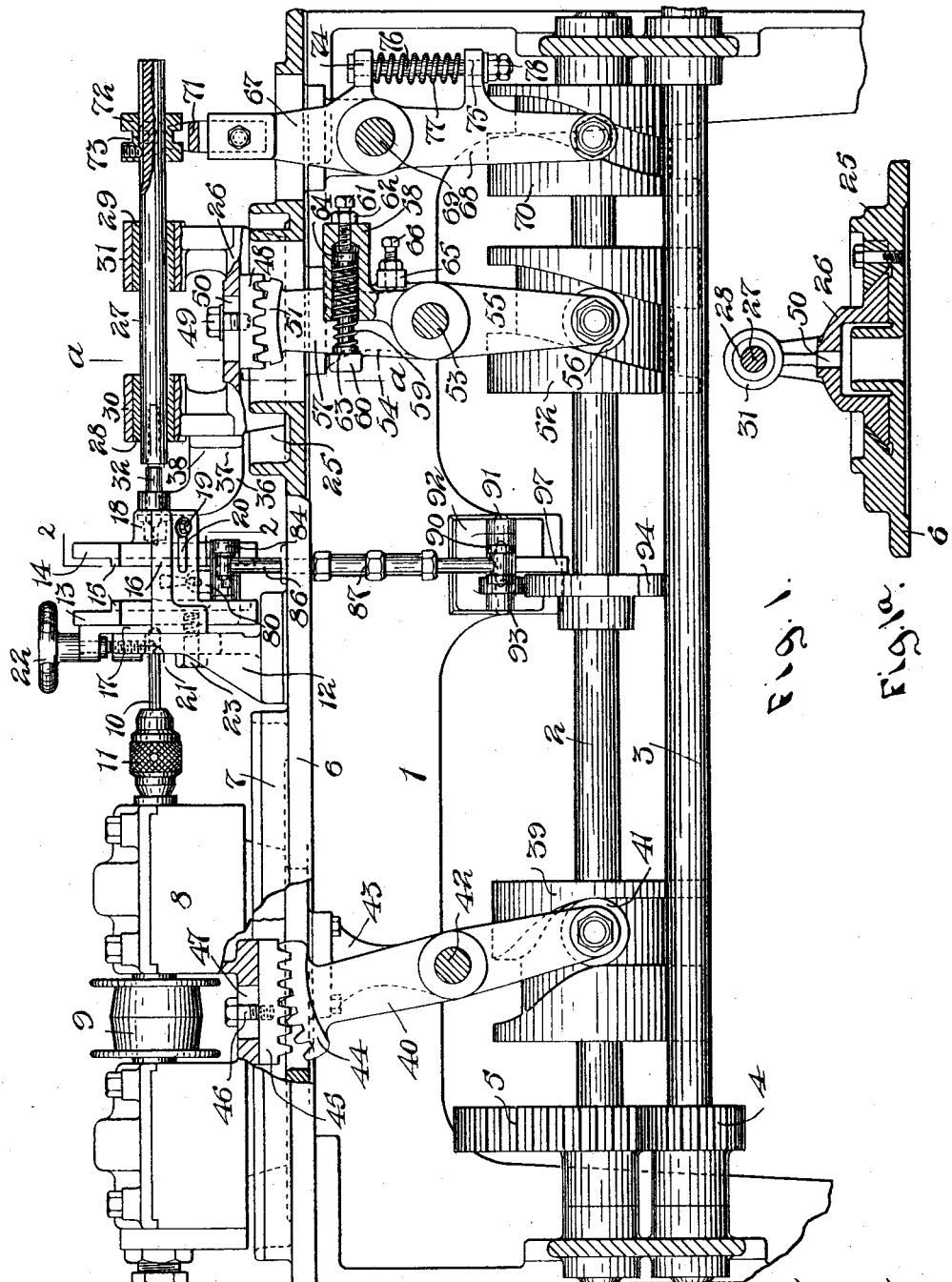
Witnesses:
Harry L. Allen
Inventor:
Henry N. Pierce

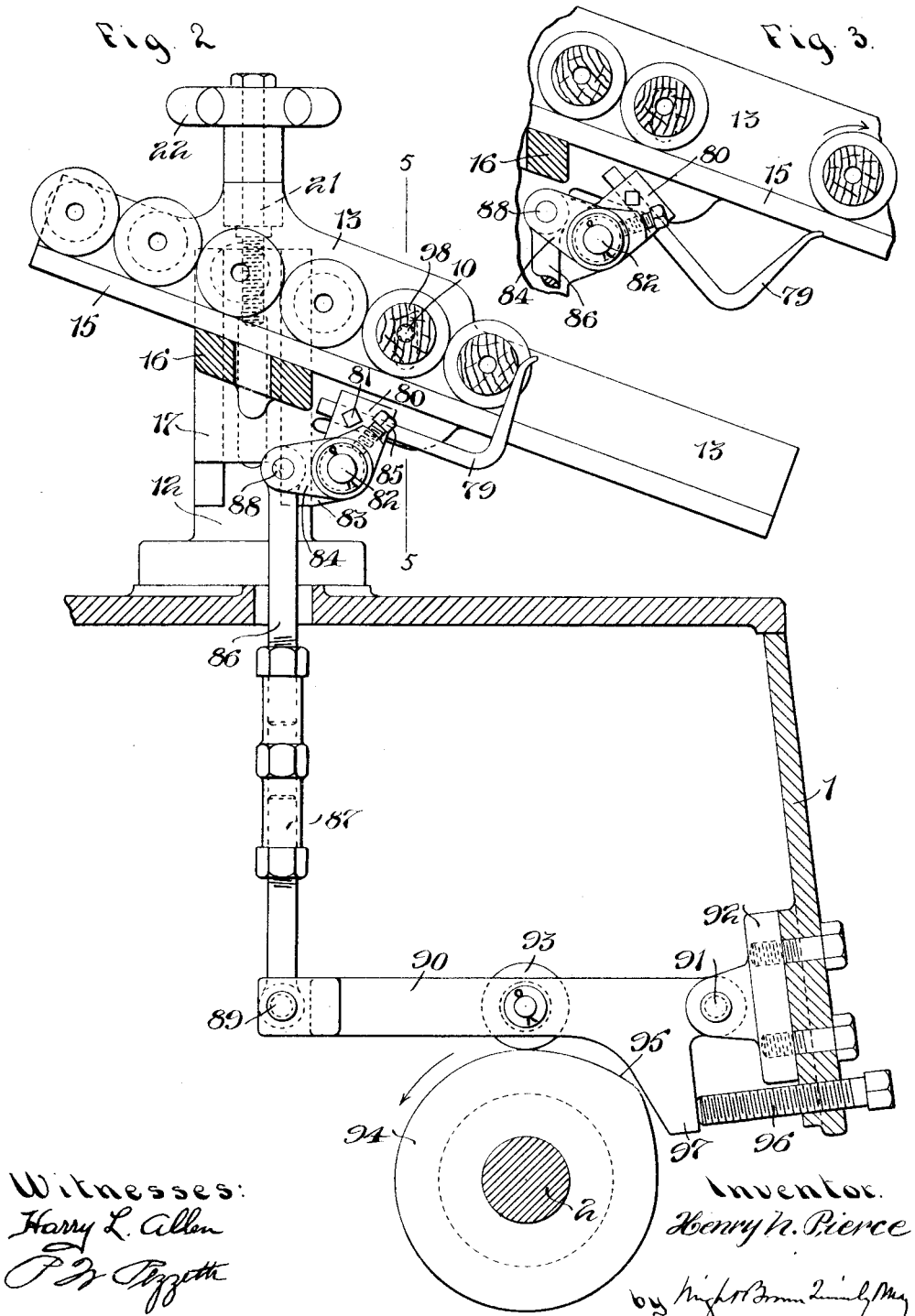

H. N. PIERCE.
WOODWORKING MACHINE.
APPLICATION FILED OCT. 7, 1911.
1,105,301.
Patented July 28, 1914.
3 SHEETS—SHEET 3.
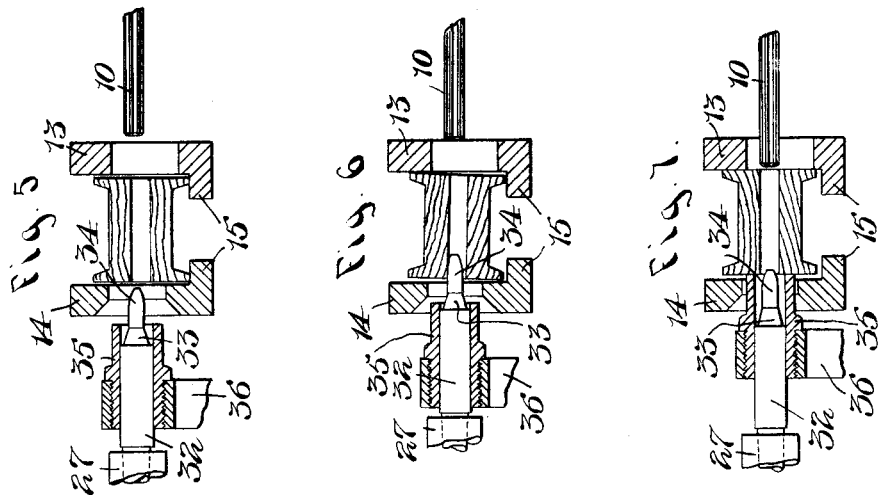
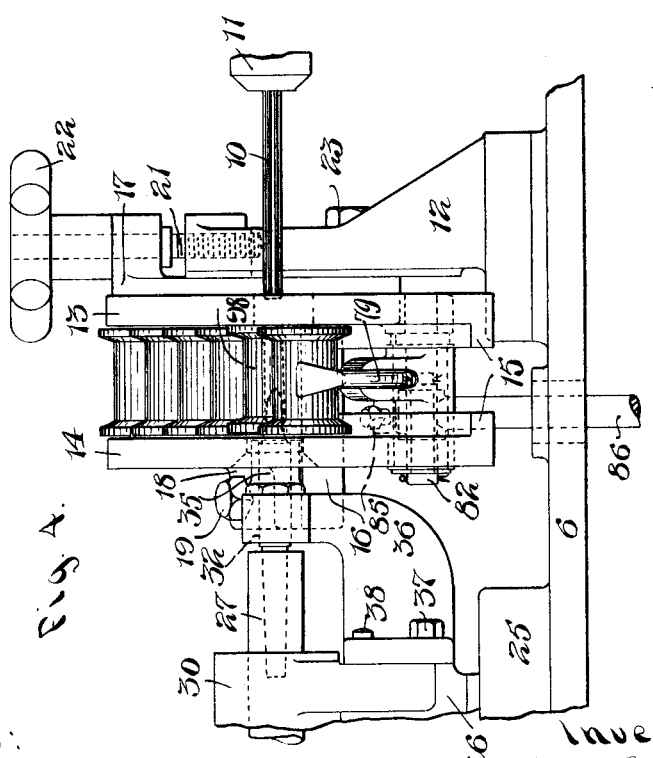

UNITED STATES PATENT OFFICE.

HENRY N. PIERCE, OF SOUTH LINCOLN, MAINE, ASSIGNOR TO THE JOHN MacGREGOR COMPANY, OF SOUTH LINCOLN, MAINE, A CORPORATION OF MAINE.

WOODWORKING-MACHINE.

1,105,301.  Specification of Letters Patent.  Patented July 28, 1914.

Application filed October 7, 1911. Serial No. 653,360.

*To all whom it may concern:*

Be it known that I, HENRY N. PIERCE, of South Lincoln, in the county of Penobscot and State of Maine, have invented certain new and useful Improvements in Woodworking-Machines, of which the following is a specification.

This invention relates to machines having rotating cutting tools designed to perform operations in the nature of boring, reaming, thread-cutting, and analogous operations on wooden blanks which have already been so far finished as to furnish surfaces or edges capable of being made use of to center or otherwise position the blank properly with respect to the tool.

The main object of the invention is to provide a machine of this character, having a rotating or revolving cutting tool, with a centering device, clamping means, and suitable operating mechanism for the above-named parts, whereby the centering device and clamping means may be operated automatically in proper timed relation to the cutting tool for positioning the blanks, holding them while being acted upon by the tool, and releasing them when finished.

Another object is to provide a new and simple escape device as part of an automatic feed for the work pieces.

In carrying my invention into practical effect I have completed a machine designed to ream the bores of already practically finished spools to standard size. In this machine the cutting tool is a reamer and the blanks upon which the work is performed are substantially complete spools; the centering device coöperates with the bore of the spool and the clamping member acts against the end of the spool. This machine is illustrated in the drawings forming a part of this application, and is described in detail in the following specification. Respecting the broader aspects of the invention, however, this particular machine is to be considered as merely illustrative and not as being the only possible embodiment of means for carrying into effect the objects hereinbefore recited.

I have in contemplation other specific embodiments of the principal elements of the invention adapted to act upon other blanks than spools and to perform other cutting or finishing operations than that of reaming. Hence, I desire it to be understood that the particular machine here represented and described is intended to be an illustration and not a limitation of the general and broader aspects of the invention.

Referring to the drawings, Figure 1 represents a side elevation of the machine above represented, showing part of the frame or base removed and showing other parts broken away. Fig. 1ª is a detailed section on line *a—a* of Fig. 1. Fig. 2 is a cross-section on line 2—2 of Fig. 1. Fig. 3 is a detailed elevation of the feed escapement, showing the same in position for releasing. Fig. 4 is an elevation as seen from the side opposite to that represented in Fig. 1, of the principal parts of the machine. Figs. 5, 6 and 7 are sectional views taken on line 5—5 of Fig. 2, representing different stages in the operation.

The same reference characters indicate the same parts in all the figures.

Referring to the drawings 1 represents the base or frame by which the working parts of the machine are supported. This base or frame may be of any desired character whatever, and is designed to be set on the floor of the shop or mill where the machine is installed. In the ends of the base are bearings which support a cam shaft 2 and a driving shaft 3, the latter being adapted to carry tight and loose pulleys for receiving motion by belting from a countershaft. Said pulleys and the extension of the shaft on which they are mounted are not here shown, because they are not material to an understanding of the invention and can be supplied by any skilled mechanic. Shaft 3 drives shaft 2 through a pinion 4 and a gear 5 secured on the respective shafts.

The top plate 6 of the base has guideways 7 upon which slides a headstock 8 carrying a spindle by which the operating tool is rotated. On the spindle is a pulley 9 adapted to be rotated by a belt from a countershaft not shown, and to rotate the spindle. The cutting tool, which in this machine is a reamer, is shown at 10 and is held in a chuck 11 on the end of the head-stock spindle.

Mounted upon the top plate is a post 12 which carries a chute or guide for the blanks. Such chute consists of two side members 13 and 14 formed as long plates or bars having lips 15 on their inner side. These plates are supported upon an arm 16 which projects horizontally from a slide 17 mounted against the side of the post. One of the members, as 13, is fastened in the angle between the slide and arm, while the other side member 14 is adjustable in and out, on the arm. Said side member 14 has on its outer side a lug 18 resting on the arm and receiving the end of a screw 19 which passes through a slot 20 in the arm, and of which the head bears on the under side of the arm. This permits the chute to be varied in width for blanks of various lengths. The chute as a whole is adjustable vertically on the post to regulate the height thereof with respect to the cutting tool in accordance with the diameters of the blanks. For this purpose the slide 17 carries an adjusting screw 21 threaded into the post, and having a hand wheel 22. The slide is made rigid with the post in any adjustment by means of set screw 23 passing through a vertical slot in the post, and threaded into the slide. The chute crosses the axis of the cutting tool and is inclined so as to effect a gravity feed of the blanks.

Another guideway 25 is formed upon the top plate 6 and supports a slide or carriage 26 having a work clamp and bearings for a tail spindle 27 which carries the center, or centering pin, for locating the work. The bearings for the tail spindle consist of bushings 28 and 29 contained in uprights 30 and 31 rising from the carriage. Said bearings are so placed that the tail spindle is in accurate axial alinement with the head spindle and with the working tool. For a detailed representation of the work clamp and centering device reference may be had to Figs. 4 to 7. The center is indicated at 32 and has a tapered shoulder 33 which does the actual work of centering the blank and with an extension 34 having a tapered end. The clamp is a thimble or sleeve 35 surrounding the center with a sliding fit and secured in a bracket 36 mounted upon the end of the carriage 26. Such bracket is secured to the upright 30 of the carriage, by screws 37 and dowels 38.

The operation of the machine includes endwise movements of the center, the clamp, and the cutting tool, and such movements are imparted from the cam shaft 2 by means as follows: A cam 39 secured on the cam shaft acts upon a lever 40 through an anti-friction roll 41, to swing the lever about a stud 42 on a bracket 43 beneath the top 6. This cam lever carries a gear segment 44 meshing with a rack 45 secured to the head-stock. Adjustment of the path of travel of the head-stock is made by connecting the rack adjustably to the head-stock by means of a screw 46 passing through a longitudinal slot 47 in the head-stock base. As the lever 40 swings in a plane parallel to the axis of the headstock spindle, the cutting tool is moved longitudinally.

The carriage 26, or tail stock, is likewise provided with a rack shown at 48, adjustably secured by means of a screw 49 passing through a slot 50 in the carriage. It is driven by a gear segment 51 carried by a compound lever which is actuated by a cam 52 secured upon the cam shaft 2. Said compound lever consists of two main parts both mounted upon a stud 53 secured to a bracket 54. One of these parts, as 55, is engaged with and actuated by the cam 52 through a roll 56, and the other part 57 carries the gear segment. These two parts are elastically and yieldingly connected in order to cause a certain, but not excessive, pressure to be applied in clamping the work. Connected to the lever member 55 is an upstanding arm carrying a socket 58 in which is contained a spring 59 bearing against a lug 60 on the lever member 57. A set screw 61 passing through the end of the socket regulates the tension of the spring and is secured by a lock nut 62. The abutments for the ends of the spring are short, headed studs 63 and 64 of which the shanks extend somewhat into the ends of the spring. The spring acts when the tail stock carriage is moving toward the work. For returning the carriage I provide a lug 65 on the lever member 57 on the opposite side of the member 55 from the lug 60, and carrying an adjustable set screw 66.

The tail spindle 27 which carries the center is likewise movable independently of the clamp and the cutting tool by a compound lever consisting of the parts 67 and 68 mounted upon a fulcrum stud 69 and actuated by a cam 70. The lever member 67 supports in an adjustable manner a yoke 71 having arms embracing a collar 72 secured upon the tail spindle. The collar has a groove 73 receiving studs, shown in dotted lines in Fig. 1, on the arms of the yoke. The lever members 67 and 68 have lugs 74 and 75 respectively, through which passes loosely a rod 76 surrounded by a spring 77. The rod has a head on one end and nuts 78 on the other outside of the lugs 74 and 75, while the spring 77 is contained between the lugs. Thus the center is pressed yieldingly toward the work and is positively withdrawn therefrom.

I have provided an automatic escape device which permits the blanks to be fed one by one into nearly the correct position for being acted upon, and retains them in such position until they are engaged by the centering device. Such escape device consists of a stop 79 conveniently formed as a hook, and having a shank secured adjustably in a passage in a rocker 80 by means of a set screw 81. The rocker is adapted to oscillate about a stud 82 secured to a bracket 83 on the side of the feed chute slide. A lever 84 which oscillates about the said stud is adjustably secured to the rocker 80 by a set screw 85. An endwise adjustable arm 86 consisting of two members threaded into a coupling sleeve 87, is pivoted at 88 to the arm 84 and at 89 to an arm 90, which latter is pivoted at 91 to a bracket 92 secured to the machine base 1. A roll 93 is carried by the lever 90 and rests upon the periphery of a cam 94 secured to the cam shaft 2. The cam 94 is mainly circular and normally holds the parts as shown in Fig. 2, with the stop 79 blocking the endmost blank in the chute. When the cam protuberance 95 passes under the roll 93 the lever 90 and the rock arm 84 are raised, and the stop 79 lowered into the position shown in Fig. 3 whereby the endmost blank is released. A stop screw 96 is arranged adjustably beside the arm 97 on the lever 90 to enable the movement of the stop 79 to be made less than that caused by the full throw of the cam if desired.

The operation of the machine is as follows: It being assumed that the stop 79 is in operative position, as shown in Fig. 2, and the chute filled with blanks, such as spools, the endmost spool is engaged by the stop and the second spool, indicated at 98, is in approximate alinement with the cutting tool, as is shown in Fig. 2. The first part of the operation causes the tail shaft 27 to be moved toward the cutter, whereupon the extension pin 34 of the center enters the bore of the spool and the tapered shoulder 33 engages one end of the bore and centers it exactly. Immediately thereafter, and while the center is still bearing against the spool under the pressure of spring 77, the clamp 35 engages the same end of the spool and pushes the other end thereof against the side 13 of the chute, clamping the spool tightly. The center now withdraws, leaving the spool supported frictionally between the wall 13 and the clamp 35, due to the pressure of the latter, with its bore accurately alined with the reamer. As the center withdraws the reamer advances, passes entirely through the spool, and withdraws. Thereupon the clamp 35 withdraws and the spool is released. At some time subsequent to the entrance of the center into the spool 98, and prior to the withdrawal of the clamp 35, the stop 79 has been depressed long enough to permit the lowermost spool to escape, and then returned ready to arrest the just completed spool and to allow the next spool to drop into position. The cycle of operations is then repeated.

The surfaces of the cams and their positions upon the shaft 2 are so designed as to cause the operations of the machine to be performed in the sequence above described. The mode in which the cams may be thus timed to secure the desired results will be understood by any skilled machine designer.

In Figs. 5, 6 and 7 I have illustrated in an exaggerated fashion the manner in which first the center and then the clamp act to locate the spool accurately. In the first place the chute is so adjusted as to height and the stop 79 so placed that the second spool of the series will lie slightly below and beyond the axis of the reamer. The taper on the end of the center is great enough to cause the pin extension 34 to enter the bore of the spool, even when the latter is considerably out of line and makes it unnecessary to adjust the chute and stop with more than an approximate degree of precision. The sides 13 and 14 are so adjusted that the spools may roll freely between them, but without too much lost motion. The effect of the center when it enters and engages one end of the spool is to raise this end somewhat, as shown in an exaggerated way in Fig. 6. When so raised the axis of the spool may be somewhat inclined to the axis of the reamer. When the clamp, the face of which is in a plane exactly perpendicular to the axis of the reamer and center, engages the nearest end of the spool and presses the other end thereof against the face of the chute wall 13, which also is exactly perpendicular to the same axis, the lower end of the spool is likewise raised. It will be seen that the spool is thus positioned for the final operation by reference to certain lines or surfaces which have already been accurately located. If the thing acted upon is not an already practically complete spool, the surfaces formed by the cutting tool 10 may serve as a base with respect to which the blank may be located for further operations.

By so arranging the stop 79 that the spool next to the end is the one acted upon, I have made it possible to utilize the spool centering and clamping devices as parts of the escapement mechanism, and to dispense with a complete separate escapement, thus simplifying the machine and requiring fewer parts than would otherwise be necessary.

I desire to state that I do not limit my invention to a machine in which the centering device is like a plug and enters an opening in the work, nor to one in which the clamping member is outside of the center. A centering device made as a hollow cone, or having diverging elements not necessarily forming a complete cone, adapted to bear upon external edges of the work, is within the scope of my invention, and so also is the combination with any centering device of a clamp either inside or outside of the centering device.

I claim,—

1. A machine for boring partially finished blanks comprising a head stock, a rotatable boring tool carried by said head stock, a centering tool having inclined surfaces converging toward a point in the axial line of said boring tool, the boring and centering tools being so arranged that such axial line is approximately horizontal, a blank feeding guide crossing such axial line having a work-supporting surface parallel to such line and including in its construction a face plate perpendicular to such axial line and to said work supporting surface arranged at the end of the blank remote from said centering tool, a clamp movable toward and from said face plate to clamp a blank against the same after the latter has been positioned by the centering tool, and mechanism for operating the centering tool clamp and boring tool in proper sequence.

2. A machine of the character stated comprising a bed, a head stock movable in a substantially horizontal direction on said bed, a rotating boring tool carried by said head stock with its axis parallel to the line of movement of the latter, a tail stock mounted upon the bed and movable thereon in the same directions as the head stock, a centering tool carried by the head stock in line with the boring tool and having non-parallel faces converging toward a point in the axial line of the boring tool, a face plate crossing such axial line in a plane approximately perpendicular thereto, guiding means for blanks arranged to support such blanks with an end of each substantially in contact with such face plate and also arranged to permit a gravity feed of the blanks, a stop for arresting the lowermost blank when substantially coaxial with such axial line, and mechanism for operating the centering tool to co-act with the face plate in centering a blank, and for advancing the boring tool into and withdrawing it from the blank after the latter has been centered.

3. In a machine of the character indicated the combination with a substantially horizontal cutting tool of centering means comprising a face plate having a substantially vertical surface a work support arranged to support a blank with one end thereof adjacent to said plate, a centering tool having inclined faces adapted to engage the opposite end of the blank from the face plate, said faces converging toward a point in the axial line of the cutting tool, and being at some points nearer to the axis and at other points more remote from the axis than the portions of the blank with which they engage said centering tool being movable toward and from the cutting tool.

4. In a machine of the character described the combination of a rotary cutting tool, a centering tool separated from the cutting tool, means for feeding blanks automatically between said cutting tool and said centering tool, a face plate arranged adjacent to an end of the blank which is in position to be operated upon, and against which such blank is pressed by the centering tool, said face plate being so arranged that the blank tends to separate from it under the force of gravity, and the centering tool being constructed both to press the blank against said face plate and to center the blank relatively to the axial line of the cutting tool, and a clamp having a passage to admit the cutting tool, arranged to press on the same end of the blank which is engaged by the centering tool, the centering tool and clamp being coaxial, and relatively movable axially and one being surrounded by the other.

5. A wood-working machine comprising a rotary cutting tool, a carriage for said tool mounted on a horizontal axis movable in the direction of the axis of rotation, a center having inclined surfaces converging toward a point in alinement with such axis and movable along the line thereof, a work guide extending transversely of, and having a supporting portion parallel to, the axial line between the tool and center having a face plate perpendicular to such line, and actuating mechanism for moving said tool and center timed and arranged to move the center against one end of a work piece held by the guide, and the opposite end of such piece against said plate and then to move the tool into the work.

6. A wood-working machine comprising a rotary cutting tool having its axis approximately horizontal, a carriage for said tool movable in the direction of the axis of rotation, a center having inclined surfaces converging toward a point in alinement with such axis and movable along the line thereof, a gravity feed blank guide arranged to present blanks between the tool and center, complemental clamping members adjacent to the tool and center respectively, one of which is movable toward and from the other and one of which is a face plate approximately perpendicular to such axis, and actuating mechanism for said tool, center, and movable clamping member, arranged and timed to move the center toward the tool, then to move the movable clamping member toward the other, and then to move the tool toward the center.

7. A wood working machine comprising an inclined guide adapted to contain and permit a gravity feed of substantially cylindrical blanks in a direction transverse to the axes of such blanks, a face plate at one side of said guide against which corresponding ends of the several blanks are adapted to bear, a centering tool arranged at one side of said guide in position to engage the end of a blank opposite to that end which comes next to said face plate, means for moving said centering tool toward and from the guide, said centering tool having inclined work-engaging elements converging toward a common point, which elements are adapted to engage the end of the blank, and by pressing the opposite end of the blank against the face plate, locating the blank in a certain definite position, a rotating cutting tool located at the opposite side of the guide from said centering tool and having its axis in line with the point toward which the engaging elements of said centering tool converge, and means for causing said tool to enter and withdraw from a blank positioned by said centering tool.

8. A spool reaming machine comprising an inclined guide down which the spools are adapted to pass by gravity and in which they are contained with their axes perpendicular to the direction of the feeding movement, a displaceable stop for arresting the spools in said guideway, a centering tool and a cutting tool arranged in alinement with each other on respectively opposite sides of the spool guide and with their axial line approximately coincident with the axis of one of the spools in said guide, said centering tool including a portion adapted to enter the bore of the spool and an adjacent tapered portion adapted to engage the edges of said bore, a clamping device surrounding said centering tool, said centering tool and clamping device being each movable axially independently of the other, and the cutting tool being also independently movable axially, a plate adjacent to the end of the spool opposite to that engaged by the centering tool and clamping device, and mechanism for giving endwise movements to the centering tool, clamping member, and cutting tool to cause the centering member to first enter and position a spool, then to cause the clamping member to press the spool against the face plate, and then to cause the cutting tool to pass into the bore of the spool.

9. A machine for cutting surfaces of revolution in or on wooden blanks comprising a horizontally alined rotating cutting tool and centering tool relatively movable toward and from one another, a substantially vertical positioning plate between said tools against which a blank may be pressed and over which it may be shifted by said centering tool, and means for advancing said cutting tool through said positioning plate into engagement with the work.

10. A machine of the character described including a rotary cutting tool, a centering device movable in alinement with the axis of the cutting tool toward and from the latter, a chute for work pieces crossing the axial line at such an angle to the horizontal as to effect a gravity feed of work pieces, and a stop arranged to obstruct the chute at such a point that the blank next to the endmost blank is in position to be engaged by the centering tool and the cutting tool.

11. In a machine of the character described, the combination with a cutting tool and a work-centering tool in alinement therewith, a guide for work pieces, a stop extending across the path of the work in the guide, and means for moving the stop and centering tool alternately, whereby they are adapted to act as an escape mechanism for permitting release of the finished pieces.

12. A spool reaming machine including an inclined chute adapted to support and guide the spools with their axis perpendicular to the direction of movement, a stop projecting into the path of feed of the spools and removable from such path, a rotating cutting tool and a spool centering pin located in axial alinement at respectively opposite sides of the chute and in approximate alinement with the spool next to that engaged by the stop, mechanism for moving the centering tool in the line of its axis to engage said second spool, and mechanism for displacing the stop to release the first spool, and for returning the stop into spool-arresting position.

13. A spool reaming machine comprising a guide for spools along which they are led in a direction perpendicular to their axes, said guide having a face plate at one side a rotary reaming tool mounted parallel with the axes of said spools at one side of such guide and movable lengthwise of its axis, a centering tool on the other side of the spool guide from the reaming tool and in axial alinement therewith, means for moving said tool toward the guide whereby it is caused to engage and center a spool therein with respect to the reaming tool by coöperation with said face plate, a clamp, and means for moving said clamp in a direction parallel to the movement of the centering tool whereby it is caused to engage a spool and press it against said face plate.

14. In a machine of the character described, the combination of a vertical positioning plate and an opposed clamping member adapted to engage opposite ends of a spool and grip a spool between them, and means for feeding said tool between said positioning plate and clamping member, a centering tool having a projection adapted to enter the bore of the spool and having a conical enlargement to engage the edges of such bore, means for moving said centering tool endwise into one end of the spool, whereby to position the same by coöperation with the positioning plate, means for pressing said clamping member against the spool, a reaming tool mounted to rotate on an axis in line with the centering tool and mounted also for endwise movement, and means for projecting said reaming tool into the spool at the opposite end from that entered by the centering tool.

15. A machine of the character indicated, comprising a guide for the blanks to be operated upon, a rotating cutter, a centering device movable toward and from the cutter in approximate alinement therewith, spring actuating means for moving said centering tool toward the work and causing it to engage the same with a certain and yielding pressure, a clamp, and spring actuated means for moving said clamp toward the work and causing it to engage the same with a certain and yielding pressure.

16. In a machine of the character described, the combination of work-engaging elements, movable independently of one another in the same directions toward and from the work, one of said elements being a clamp and the other having flaring work-engaging elements or surfaces, and constituting a centering tool, one of said elements being so disposed as to surround the other.

In testimony whereof I have affixed my signature, in presence of two witnesses.

HENRY N. PIERCE.

Witnesses:
RODERICK J. MACGREGOR,
ERNEST E. MORSE.

---

Copies of this patent may be obtained for five cents each, by addressing the "Commissioner of Patents, Washington, D. C."